United States Patent
Sun et al.

(10) Patent No.: US 12,107,634 B2
(45) Date of Patent: Oct. 1, 2024

(54) ON-CHIP ADAPTIVE OPTICAL RECEIVER SYSTEM, OPTICAL CHIP, AND COMMUNICATION DEVICE

(71) Applicant: PENG CHENG LABORATORY, Shenzhen (CN)

(72) Inventors: Caiming Sun, Shenzhen (CN); Shupeng Deng, Shenzhen (CN); Weiwei Liu, Shenzhen (CN); Aidong Zhang, Shenzhen (CN); Xiaomin Nie, Shenzhen (CN); Zhenmin Chen, Shenzhen (CN); Hongjie Wang, Shenzhen (CN); Xinke Tang, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 0 days.

(21) Appl. No.: 18/278,478

(22) PCT Filed: Jun. 28, 2021

(86) PCT No.: PCT/CN2021/102740
§ 371 (c)(1),
(2) Date: Aug. 23, 2023

(87) PCT Pub. No.: WO2022/179020
PCT Pub. Date: Sep. 1, 2022

(65) Prior Publication Data
US 2024/0089010 A1    Mar. 14, 2024

(30) Foreign Application Priority Data

Feb. 23, 2021    (CN) .......................... 202110202689.6

(51) Int. Cl.
*H04B 10/61*    (2013.01)

(52) U.S. Cl.
CPC ....... *H04B 10/6165* (2013.01); *H04B 10/615* (2013.01)

(58) Field of Classification Search
CPC .......................... H04B 10/61; H04B 7/18515; H04B 10/6165; H04B 10/615; G01S 7/486; H04Q 3/2676; H04Q 3/2682
(Continued)

(56) References Cited

U.S. PATENT DOCUMENTS

| 6,597,836 B2 | 7/2003 | Johnson et al. |
| 10,629,989 B2 * | 4/2020 | Tennant ............... H04B 10/505 |

(Continued)

FOREIGN PATENT DOCUMENTS

| CN | 103368655 A | 10/2013 |
| CN | 106559134 A | 4/2017 |

(Continued)

OTHER PUBLICATIONS

Yan et al., "Chip of Phase Control Arrays Based on Silica on Silicon", Acya Photonica Sinica, 2019, pp. 1-8, vol. 48, No. 4.

*Primary Examiner* — Mohammad R Sedighian
(74) *Attorney, Agent, or Firm* — The Webb Law Firm

(57) ABSTRACT

An on-chip adaptive optical receiver system, an optical chip, and a communication device are disclosed, which are applied to optical communication. The on-chip adaptive optical receiver system includes an antenna array configured for separating received spatial light to obtain a plurality of sub-light spots; an optical phased array configured for performing phase-shifting processing and beam combining processing on the sub-light spots to obtain combined light; and an optical receiving module configured for demultiplexing the combined light to obtain beacon light. The optical receiving module is further configured for detecting intensity information of the beacon light and generating a feed- (Continued)

AA    Antenna array
RC    Receiver chip
DM    Demultiplexer
PD    Photodetector back signal according to the intensity information. The optical phased array is further configured for performing compensation phase-shifting processing and intensity equalization processing on the sub-light spots according to the feedback signal to obtain compensated combined light, and outputting the compensated combined light to the optical receiving module.

10 Claims, 4 Drawing Sheets

(58) Field of Classification Search
USPC ........ 398/202, 203, 204, 206, 207, 208, 209
See application file for complete search history.

(56) References Cited

U.S. PATENT DOCUMENTS

| | | |
|---|---|---|
| 2003/0002790 A1 | 1/2003 | Johnson et al. |
| 2004/0161239 A1 | 8/2004 | Bruesselbach et al. |
| 2005/0135815 A1 | 6/2005 | Gerwe et al. |
| 2019/0326999 A1 | 10/2019 | Kato et al. |
| 2021/0013966 A1 | 1/2021 | Haraguchi et al. |
| 2021/0181310 A1 | 6/2021 | Lu et al. |
| 2022/0302585 A1 | 9/2022 | Wang |

FOREIGN PATENT DOCUMENTS

| | | | | |
|---|---|---|---|---|
| CN | 107615725 A | | 1/2018 | |
| CN | 107966691 A | | 4/2018 | |
| CN | 109991582 A | | 7/2019 | |
| CN | 107615725 B | | 1/2020 | |
| CN | 110741276 A | | 1/2020 | |
| CN | 111277334 A | | 6/2020 | |
| CN | 111948626 A | | 11/2020 | |
| CN | 111988091 A | | 11/2020 | |
| CN | 112068107 A | | 12/2020 | |
| CN | 117040575 A | * | 11/2023 | ............... H04B 7/06 |
| CN | 117375725 A | * | 1/2024 | ............. H04B 10/60 |
| WO | WO-2017117584 A1 | * | 7/2017 | ............. H01Q 1/288 |
| WO | 2019140720 A1 | | 7/2019 | |
| WO | 2020181630 A1 | | 9/2020 | |
| WO | 2021003708 A1 | | 1/2021 | |

* cited by examiner

| | |
|---|---|
| AA | Antenna array |
| OPA | Optical phased array |
| OCM | Optical receiving module |
| FS | Feedback signal |
| FFS | First feedback signal |
| SFS | Second feedback signal |

| AA | Antenna array |
| RC | Receiver chip |
| DM | Demultiplexer |
| PD | Photodetector |

ON-CHIP ADAPTIVE OPTICAL RECEIVER SYSTEM, OPTICAL CHIP, AND COMMUNICATION DEVICE

CROSS-REFERENCE TO RELATED APPLICATION

This application is the United States national phase of International Application No. PCT/CN2021/102740, filed Jun. 28, 2021, and claims priority to Chinese Patent Application No. 202110202689.6, filed Feb. 23, 2021, the disclosures of which are hereby incorporated by reference in their entireties.

BACKGROUND

1. Technical Field

The present disclosure relates to the technical field of optical communication, and in particular, to an on-chip adaptive optical receiver system, an optical chip, and a communication device.

2. Technical Considerations

Spatial light communication systems use water/atmosphere as the transmission medium. As the turbulence effect causes fluctuations in the refractive index of the transmission medium, the amplitude and phase of light change randomly, affecting the quality of spatial beams. Especially, the wavefront phase mismatch caused by turbulence has serious impact on the performance of coherent optical communication. Therefore, an adaptive correction technology needs to be introduced in spatial light communication systems to overcome the impact of turbulence on signal light.

At present, an adaptive system includes a wavefront detector, a wavefront corrector, and a controller. After being corrected by the adaptive system, a distorted wavefront is coupled to an optical fiber for demodulation by a receiver. The wavefront detector and the wavefront corrector are both spatial optical elements, which are of a large size and difficult to assemble, and cannot be integrated with a receiver, failing to meet the requirements on miniaturization and high integration.

The above content is merely used for helping understand the technical schemes of the present disclosure, and does not mean that the above content is recognized as the prior art.

SUMMARY

A main objective of the present disclosure is to provide an on-chip adaptive optical receiver system, an optical chip, and a communication device, to solve the technical problems of low integration and large size of the on-chip adaptive optical receiver system in existing technologies.

To achieve the above objective, the present disclosure provides an on-chip adaptive optical receiver system, which is applied to optical communication. The on-chip adaptive optical receiver system includes: an antenna array, an optical phased array, and an optical receiving module, where an output end of the antenna array is connected to an input end of the optical phased array, an output end of the optical phased array is connected to an input end of the optical receiving module, and a feedback end of the optical receiving module is connected to a receiving end of the optical phased array;

the antenna array is configured for separating received spatial light to obtain a plurality of sub-light spots and outputting the sub-light spots to the optical phased array;

the optical phased array is configured for performing phase-shifting processing and beam combining processing on the sub-light spots to obtain combined light, and outputting the combined light to the optical receiving module;

the optical receiving module is configured for demultiplexing the combined light to obtain beacon light;

the optical receiving module is further configured for detecting intensity information of the beacon light, generating a feedback signal according to the intensity information, and outputting the feedback signal to the optical phased array; and the optical phased array is further configured for performing compensation phase-shifting processing and intensity equalization processing on the sub-light spots according to the feedback signal to obtain compensated combined light, and outputting the compensated combined light to the optical receiving module.

In an embodiment, the antenna array includes a plurality of antenna units; the optical phased array includes a phase shifter array and an adjustable beam combiner, where the phase shifter array includes a plurality of first phase shifters, an input end of the first phase shifter is connected to an output end of the antenna unit, and an output end of the first phase shifter is connected to an input end of the adjustable beam combiner;

the phase shifter array is configured for performing the phase-shifting processing on the sub-light spots and outputting the phase-shifted sub-light spots to the adjustable beam combiner; and the adjustable beam combiner is configured for performing the beam combining processing on the phase-shifted sub-light spots to obtain combined light, and outputting the combined light to the optical receiving module.

In an embodiment, the optical receiving module includes a demultiplexer, a receiver chip, and a photodetector; an input end of the demultiplexer is connected to an output end of the adjustable beam combiner, an output end of the demultiplexer is connected to an input end of the receiver chip, and another output end of the demultiplexer is connected to an input end of the photodetector;

the demultiplexer is configured for demultiplexing the combined light to obtain signal light and beacon light, outputting the signal light to the receiver chip, and outputting the beacon light to the photodetector; and the photodetector is further configured for detecting the intensity information of the beacon light, generating a feedback signal according to the intensity information, and sending the feedback signal to the optical phased array.

In an embodiment, the feedback signal includes a first feedback signal, and the phase shifter array is further configured for receiving the first feedback signal and performing distortion compensation phase-shifting processing on the sub-light spots according to the first feedback signal to obtain compensated sub-light spots; and the phase shifter array is further configured for outputting the compensated sub-light spots to the adjustable beam combiner.

In an embodiment, the feedback signal includes a second feedback signal, and the adjustable beam combiner is further configured for receiving the second feedback signal and performing intensity compensation and beam combining on the compensated sub-light spots according to the second feedback signal to obtain compensated combined light; and the adjustable beam combiner is further configured for outputting the compensated combined light to the demultiplexer.

In an embodiment, the demultiplexer is further configured for demultiplexing the compensated combined light to obtain compensated signal light and outputting the compensated signal light to the receiver chip; and the receiver chip is configured for demodulating the compensated signal light.

In an embodiment, the adjustable beam combiner includes a plurality of first two-way adjustable beam splitters and a plurality of second two-way adjustable beam splitters, where an input end of the first two-way adjustable beam splitter is connected to the output end of the first phase shifter, the second two-way adjustable beam splitters are cascaded in sequence to form a beam splitter cascade, an output end of the first two-way adjustable beam splitter is connected to an input end of the beam splitter cascade, and an output end of the beam splitter cascade is connected to the input end of the demultiplexer;

the first two-way adjustable beam splitter includes a first coupler, a second phase shifter, and a second coupler, where the first coupler corresponds to two first phase shifters, inputs end of the first coupler are connected to the output ends of the first phase shifters, an output end of the first coupler is connected to an input end of the second phase shifter, another output end of the first coupler is connected to an input end of the second coupler, an output end of the second phase shifter is connected to another input end of the second coupler, and an output end of the second coupler is connected to the input end of the beam splitter cascade; and the second two-way adjustable beam splitter includes a third coupler, a fourth coupler, a third phase shifter, and a fourth phase shifter, where an input end of the third phase shifter is a first input end of the second two-way adjustable beam splitter, an output end of the third phase shifter is connected to an input end of the third coupler, another input end of the third coupler is a second input end of the second two-way adjustable beam splitter, an output end of the third coupler is connected to an input end of the fourth phase shifter, another output end of the third coupler is connected to an input end of the fourth coupler, and the fourth coupler has only one output end.

In an embodiment, the adjustable beam combiner is formed by cascading a plurality of fifth couplers, the fifth couplers each include two input ends and an output end, an input end of the coupler cascade is connected to the output end of the first phase shifter, and an output end of the coupler cascade is connected to the input end of the demultiplexer.

In addition, to achieve the above objective, the present disclosure further provides an optical chip, including the on-chip adaptive optical receiver system described above.

In addition, to achieve the above objective, the present disclosure further provides a communication device, including the optical chip described above.

In the present disclosure, an on-chip adaptive optical receiver system is provided, which is applied to optical communication. The on-chip adaptive optical receiver system includes: an antenna array, an optical phased array, and an optical receiving module, where an output end of the antenna array is connected to an input end of the optical phased array, an output end of the optical phased array is connected to an input end of the optical receiving module, and a feedback end of the optical receiving module is connected to a receiving end of the optical phased array; the antenna array is configured for separating received spatial light to obtain a plurality of sub-light spots and outputting the sub-light spots to the optical phased array; the optical phased array is configured for performing phase-shifting processing and beam combining processing on the sub-light spots to obtain combined light, and outputting the combined light to the optical receiving module; the optical receiving module is configured for demultiplexing the combined light to obtain beacon light; the optical receiving module is further configured for detecting intensity information of the beacon light, generating a feedback signal according to the intensity information, and outputting the feedback signal to the optical phased array; and the optical phased array is further configured for performing compensation phase-shifting processing and intensity equalization processing on the sub-light spots according to the feedback signal to obtain compensated combined light, and outputting the compensated combined light to the optical receiving module. A combined light intensity detected by the detector is used as feedback to control the phase shifter to perform phase compensation, and control the beam combiner with an adjustable beam splitting ratio to implement intensity equalization. The on-chip adaptive optical receiver system of the present disclosure may be implemented on an optical chip (which may be a material system such as silicon-on-insulator, silicon nitride-on-insulator, indium phosphide-on-insulator, etc.). The on-chip adaptive optical receiver system of the present disclosure is of a small size, does not require assembly, and can be integrated on the same chip together with a receiver system, so as to meet the requirements on miniaturization and high integration and solve the coupling problem between spatial light and the chip.

BRIEF DESCRIPTION OF DRAWINGS

In order to describe the technical schemes of the embodiments of the present disclosure or the existing technology clearly, the following briefly introduces the accompanying drawings required for describing the embodiments or the existing technology. Apparently, the accompanying drawings in the following description show only some embodiments of the present disclosure, and those having ordinary skills in the art may still derive other drawings from the structures shown in these accompanying drawings without creative efforts.

LIST OF REFERENCE NUMERALS

Figure 1:
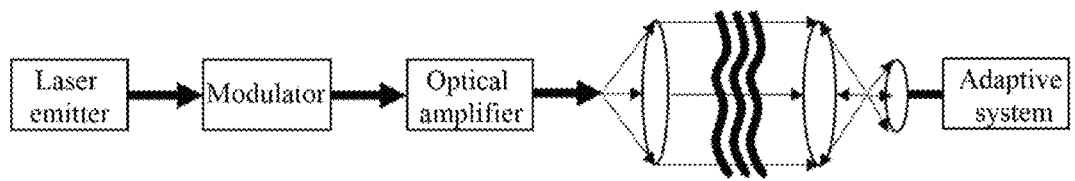
FIG. 1 is a diagram showing the principle of an adaptive system for spatial optical communication according to the present disclosure.

| Reference numeral | Name | Reference numeral | Name |
|---|---|---|---|
| 100 | Antenna array | 301 | Demultiplexer |
| 200 | Optical phased array | 302 | Receiver chip |
| 300 | Optical receiving module | 303 | Photodetector |
| 101 | Antenna unit | PS1 to PS4 | First to fourth phase shifters |
| 201 | Phase shifter array | C1 to C5 | First to fifth couplers |
| 202 | Adjustable beam combiner | 2021 | First two-way adjustable beam splitter |
| | | 2022 | Second two-way adjustable beam splitter |

The objectives, functional features, and advantages of the present disclosure will be further described in conjunction with the accompanying drawings and embodiments.

DETAILED DESCRIPTION

It should be understood that the specific embodiments described herein are merely used for illustrating the present disclosure, and are not intended to limit the present disclosure.

Figure 2:
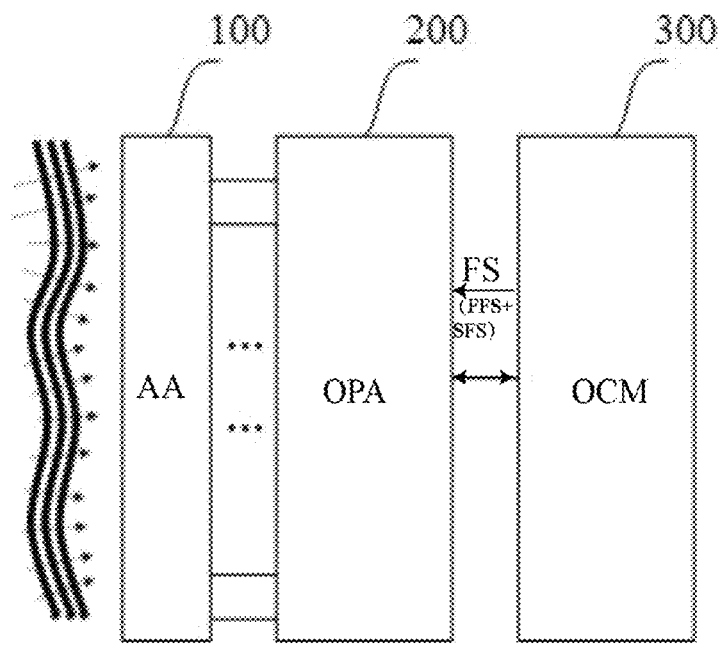
FIG. 2 is a first schematic structural diagram of a first embodiment of an on-chip adaptive optical receiver system according to the present disclosure.

Referring to FIG. 1, FIG. 1 is a diagram showing the principle of an adaptive system for spatial optical communication according to the present disclosure. FIG. 2 is a first schematic structural diagram of a first embodiment of an on-chip adaptive optical receiver system according to the present disclosure.

An embodiment of the present disclosure provides an on-chip adaptive optical receiver system, which is applied to optical communication. The on-chip adaptive optical receiver system includes: an antenna array 100, an optical phased array 200, and an optical receiving module 300. An output end of the antenna array 100 is connected to an input end of the optical phased array 200. An output end of the optical phased array 200 is connected to an input end of the optical receiving module 300. A feedback end of the optical receiving module 300 is connected to a receiving end of the optical phased array 200.

It is readily understood that the antenna array 100, the optical phased array 200, and the optical receiving module 300 are connected by an optical waveguide. Referring to FIG. 1, light emitted by a laser emitter is modulated by a modulator and amplified by an optical amplifier, and then outputted to a transmission medium. The transmission medium may be water or atmosphere. Due to the turbulence effect of water/atmosphere as the transmission medium, a wavefront distortion occurs. After receiving spatial light, the adaptive system at the receiving end detects the spatial light and compensates for the phase distortion.

It should be understood that the on-chip adaptive optical receiver system of this embodiment is implemented on an optical chip (the chip material platform may be silicon-on-insulator, silicon nitride-on-insulator, indium phosphide-on-insulator, etc., including but not limited to, the above materials, which is not limited in this embodiment).

The antenna array 100 is configured for separating received spatial light to obtain a plurality of sub-light spots and outputting the sub-light spots to the optical phased array 200.

It should be noted that the antenna array 100 may be a one-dimensional antenna array or a two-dimensional antenna array, and includes a plurality of antenna units. The antenna unit divides a received spatial light spot into a plurality of sub-light spots, couples the sub-light spots into an optical waveguide, and outputs the sub-light spots to a next-stage device.

The optical phased array 200 is configured for performing phase-shifting processing and beam combining processing on the sub-light spots to obtain combined light, and outputting the combined light to the optical receiving module 300.

It is readily understood that the optical phased array 200 includes a phase shifter array and an adjustable beam combiner. The phase shifter array is configured for phase control of the sub-light spots. The adjustable beam combiner is configured for combining the phase-shifted sub-light spots and outputting the combined light to a next-stage device through an optical waveguide.

The optical receiving module 300 is configured for demultiplexing the combined light to obtain beacon light.

It should be noted that the optical receiving module 300 includes a demultiplexer, a photodetector, and a receiver chip. The demultiplexer is configured for demultiplexing the combined light into beacon light and signal light. The receiver chip is configured for receiving the signal light. The photodetector is configured for receiving the beacon light and generating a corresponding feedback signal according to an intensity of the beacon light.

The optical receiving module 300 is further configured for detecting intensity information of the beacon light, generating a feedback signal according to the intensity information, and outputting the feedback signal to the optical phased array 200.

It should be understood that, to reduce the correction error, wavelengths of the beacon light and the signal light need to be close. In practice, the demultiplexer is designed according to actual requirements. The feedback signal is used for controlling the phase shifter array to perform phase compensation, and controlling the adjustable beam combiner to perform intensity compensation, to prevent intensity imbalance.

The optical phased array 200 is further configured for performing compensation phase-shifting processing and intensity equalization processing on the sub-light spots according to the feedback signal to obtain compensated combined light, and outputting the compensated combined light to the optical receiving module 300.

It should be noted that the optical phased array 200 includes at least the adjustable beam combiner. The adjustable beam combiner can compensate for the sub-light spots according to the feedback signal to solve the problem of uneven intensity.

It should be understood that the combined light compensated according to the feedback is outputted to the demultiplexer in the optical receiving module, the demultiplexer demultiplexes the compensated combined light into the signal light and the beacon light, and the receiver chip demodulates the compensated signal light to obtain a signal with small distortion impact. In a spatial optical communication system, as the turbulence effect causes fluctuations in the refractive index of the transmission medium, the amplitude and phase of light change randomly, affecting the communication quality. The adaptive receiver system of this embodiment not only can control the phase shifter to perform phase compensation, but also can control the beam combiner with an adjustable beam splitting ratio to implement intensity equalization.

Figure 3:
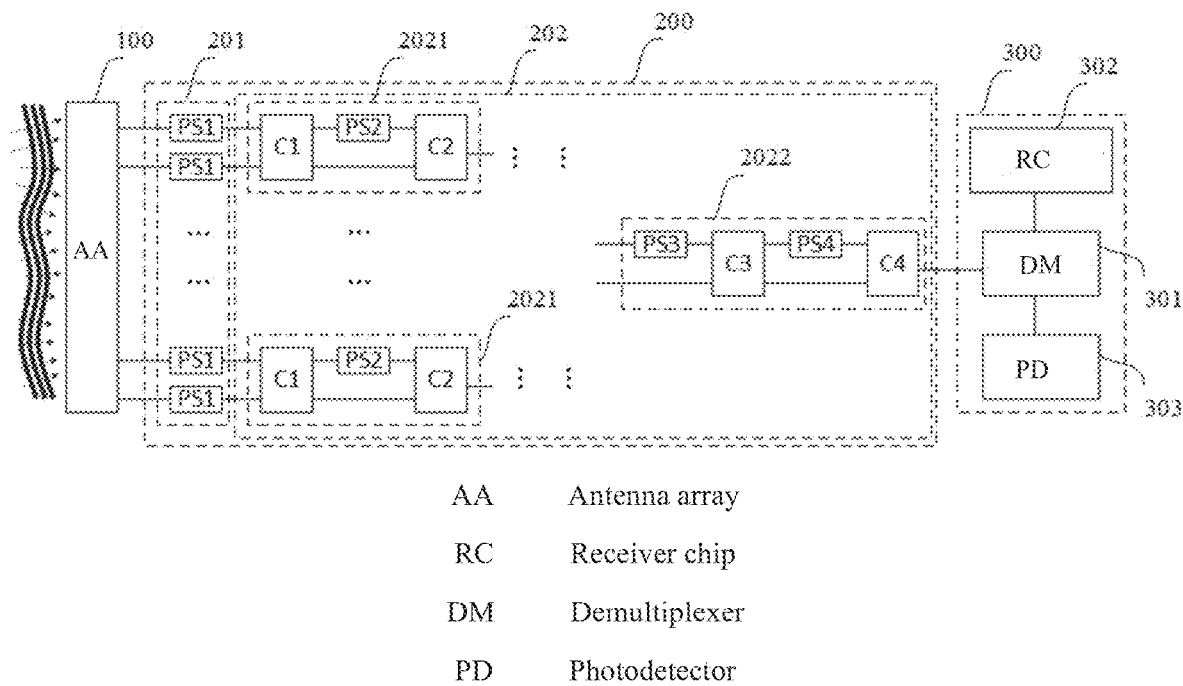
FIG. 3 is a second schematic structural diagram of the first embodiment of the on-chip adaptive optical receiver system according to the present disclosure.

FIG. 3 is a second schematic structural diagram of the first embodiment of the on-chip adaptive optical receiver system according to the present disclosure.

In an embodiment, the antenna array 100 includes a plurality of antenna units 101. The optical phased array 200 includes a phase shifter array 201 and an adjustable beam combiner 202. The phase shifter array 201 includes a plurality of first phase shifters PS1. An input end of the first phase shifter PS1 is connected to an output end of the antenna unit 101. An output end of the first phase shifter PS1 is connected to an input end of the adjustable beam combiner 202.

It should be noted that the number of antenna units 101 is equal to the number of the first phase shifters PS1.

It should be understood that for spots of obliquely incident spatial light, lengths of optical paths of the spots received by each antenna are different, so the phases of the sub-light spots entering each antenna are different. The phase difference caused by the oblique incidence can be compensated by controlling the phase shifter according to the light intensity feedback detected by the photodetector. In this way, the on-chip adaptive receiver system of this embodiment can realize receiving in a large range of angles and does not require use of equipment and elements for fine alignment such as a tilt mirror.

Figure 4:
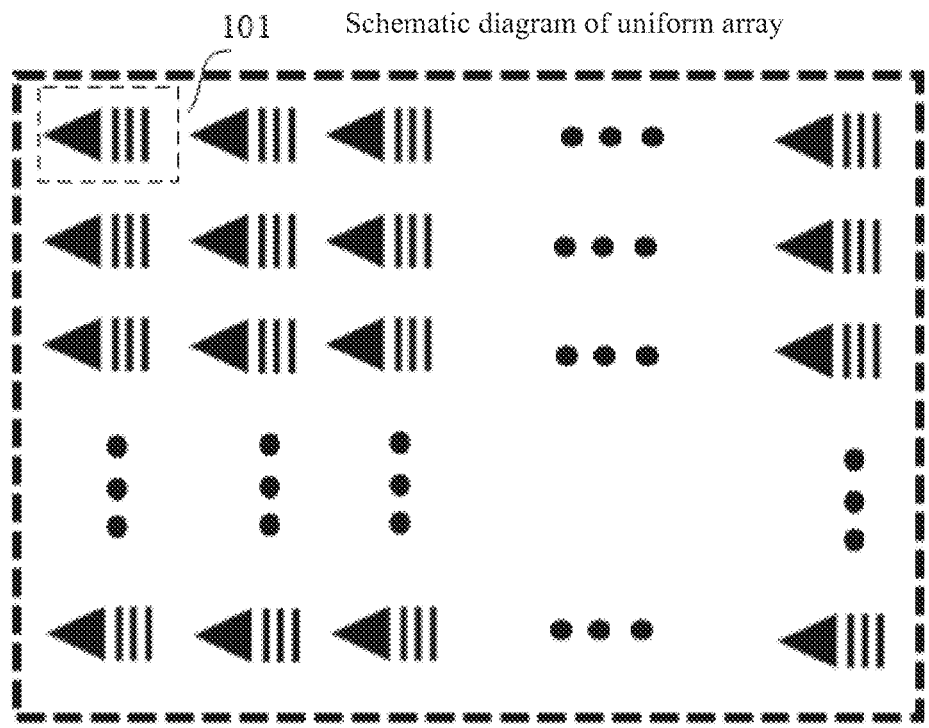
FIG. 4 is a schematic diagram of an antenna array, which is a uniform array, in the on-chip adaptive optical receiver system according to the present disclosure.
Figure 5:
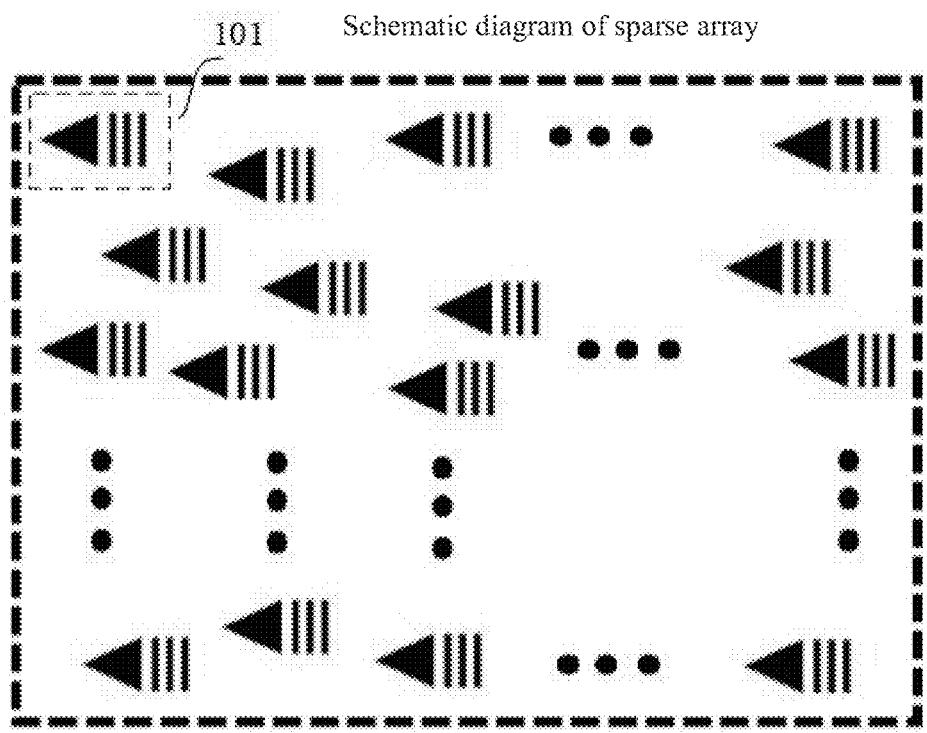
FIG. 5 is a schematic diagram of an antenna array, which is a sparse array, in the on-chip adaptive optical receiver system according to the present disclosure.

FIG. 4 is a schematic diagram of an antenna array, which is a uniform array, in the on-chip adaptive optical receiver system according to the present disclosure; and FIG. 5 is a schematic diagram of an antenna array, which is a sparse array, in the on-chip adaptive optical receiver system according to the present disclosure.

It is readily understood that the antenna array 100 may be a one-dimensional antenna array, a two-dimensional antenna array, a uniform array, a sparse array, etc. The sparse array can eliminate the influence of grating lobes and realize receiving in a large range of angles.

The phase shifter array 201 is configured for performing the phase-shifting processing on the sub-light spots and outputting the phase-shifted sub-light spots to the adjustable beam combiner 202.

It should be noted that the first phase shifters PS1 in the phase shifter array 201 may be phase shifters based on a thermo-optic effect, phase shifters based on an electro-optic effect, or other types of phase shifters.

The adjustable beam combiner 202 is configured for performing the beam combining processing on the phase-shifted sub-light spots to obtain combined light, and outputting the combined light to the optical receiving module 300.

It should be noted that according to the requirements of practical applications, the beam combiner may be formed by cascaded multimode interference (MMI) couplers, cascaded directional couplers, star couplers, or 1*N MMI couplers.

The optical receiving module 300 includes a demultiplexer 301, a receiver chip 302, and a photodetector 303. An input end of the demultiplexer 301 is connected to an output end of the adjustable beam combiner 202. An output end of the demultiplexer 301 is connected to an input end of the receiver chip 302. Another output end of the demultiplexer 301 is connected to an input end of the photodetector 303.

It is readily understood that the demultiplexer 301 may be of a micro-ring structure, a Mach-Zehnder interferometer structure, a Bragg grating structure, or other structures. The receiver chip may be a direct detection or coherent receiver.

The demultiplexer 301 is configured for demultiplexing the combined light to obtain signal light and beacon light, outputting the signal light to the receiver chip 302, and outputting the beacon light to the photodetector 303.

The photodetector 303 is configured for detecting intensity information of the beacon light, generating a feedback signal according to the intensity information, and sending the feedback signal to the optical phased array 200.

Still referring to FIG. 3, the adjustable beam combiner 202 includes a plurality of first two-way adjustable beam splitters 2021 and a plurality of second two-way adjustable beam splitters 2022. An input end of the first two-way adjustable beam splitter 2021 is connected to an output end of the first phase shifter PS1. The second two-way adjustable beam splitters 2022 are cascaded in sequence to form a beam splitter cascade. An output end of the first two-way adjustable beam splitter 2021 is connected to an input end of the beam splitter cascade. An output end of the beam splitter cascade is connected to the input end of the demultiplexer 301.

The first two-way adjustable beam splitter 2021 includes a first coupler C1, a second phase shifter PS2, and a second coupler C2. The first coupler C1 corresponds to two first phase shifters PS1. Input ends of the first coupler C1 are connected to the output ends of the first phase shifters PS1. An output end of the first coupler C1 is connected to an input end of the second phase shifter PS2. Another output end of the first coupler C1 is connected to an input end of the second coupler C2. An output end of the second phase shifter PS2 is connected to another input end of the second coupler C2. An output end of the second coupler C2 is connected to the input end of the beam splitter cascade.

The second two-way adjustable beam splitter 2022 includes a third coupler C3, a fourth coupler C4, a third phase shifter PS3, and a fourth phase shifter PS4. An input end of the third phase shifter PS3 is a first input end of the second two-way adjustable beam splitter 2022. An output end of the third phase shifter PS3 is connected to an input end of the third coupler C3. Another input end of the third coupler C3 is a second input end of the second two-way adjustable beam splitter 2022. An output end of the third coupler C3 is connected to an input end of the fourth phase shifter PS4. Another output end of the third coupler C3 is connected to an input end of the fourth coupler C4. The fourth coupler C4 has only one output end.

It is readily understood that the first to fourth phase shifters in this embodiment are phase shifters of the same type, and the first to fourth couplers are couplers of the same type. The first to fourth couplers may be 3-dB couplers.

The feedback signal includes a first feedback signal. The phase shifter array 201 is further configured for receiving the first feedback signal and performing distortion compensation phase-shifting processing on the sub-light spots according to the first feedback signal to obtain compensated sub-light spots.

The phase shifter array 201 is further configured for outputting the compensated sub-light spots to the adjustable beam combiner 202.

The feedback signal includes a second feedback signal. The adjustable beam combiner 202 is further configured for receiving the second feedback signal and performing intensity compensation and beam combining on the compensated sub-light spots according to the second feedback signal to obtain the compensated combined light. The adjustable beam combiner 202 is further configured for outputting the compensated combined light to the demultiplexer 301.

It should be noted that the adjustable beam combiner 202 is formed by a plurality of two-way adjustable beam splitters cascaded, and can realize multi-way adjustable beam combining through hierarchical control.

In an embodiment, the demultiplexer 301 is further configured for demultiplexing the compensated combined light to obtain compensated signal light and outputting the compensated signal light to the receiver chip 302. The receiver chip 302 is configured for demodulating the compensated signal light.

It should be noted that input ports of the first two-way adjustable beam splitter 2021 are two input ends of the first coupler C1. Input ports of the second two-way adjustable beam splitter 2022 are an input end of the third phase shifter PS3 and a second input end of the fourth coupler C4.

Assuming that light inputted through the input ports of the second two-way adjustable beam splitter 2022 is respectively expressed as:

$$E_{i1}=Aa_1e^{i\varphi_1}$$

$$E_{i2}=Aa_2e^{i\varphi_2}.$$

After passing through the phase shifters, the two beams of light at the input port may be respectively expressed as:

$$E_{i1}=A_1e^{i(\varphi_1+\Delta\varphi)}=Aa_1e^{i\varphi_2}e^{i\varphi}$$

$$E_{i2}=Aa_2e^{i\varphi_2},$$

where $\varphi=\varphi_1+\Delta\varphi-\varphi_2$, $A=\sqrt{A_1^2+A_2^2}$, $a_1^2+a_2^2=1$.

It is readily understood that E represents an electric field intensity corresponding to light, $E_{i1}$ represents an electric field intensity received by the input end of the first phase shifter PS1, $E_{i2}$ represents an electric field intensity received by the second input end of the first coupler C1, A represents an amplitude, $A_1$ represents an amplitude of the input end of the first phase shifter PS1, $A_2$ represents an amplitude of the second input end of the first coupler C1, $\varphi$ represents a phase, $\varphi_1$ represents an initial phase of the input end of the first phase shifter PS1, $\varphi_2$ represents an initial phase of the second input end of the first coupler C1, and $\Delta\varphi$ represents a phase shift performed by the first phase shifter PS1.

In an embodiment, according to a transmission matrix, an electric field at the output end may be calculated as follows:

$$E_o=A/2(a_1e^{i(\theta+\varphi)}+ia_2e^{i\theta}+ia_1e^{i\varphi}+a_2).$$

The intensity at the output end of the second coupler C2 can be calculated as follows:

$$P_o=A^2/2(1+(a_1^2-a_2^2)\sin(\theta)+2a_1a_2\cos(\theta)\cos(\varphi)).$$

Based on the above principle, the first phase shifter PS1 is first controlled to perform phase compensation. In an initial state, the phase of the second phase shifter PS2 is 0, and the intensity at the output end of the second coupler C2 may be expressed as:

$$P_o=A^2/2(1+(a_1^2-a_2^2)\sin(\theta)+2a_1a_2\cos(\theta)).$$

The phase shift θ of the second phase shifter PS2 is adjusted to maximize the intensity.

According to an equation:

$$P_o=A^2/2(1+(a_1^2-a_2^2)\sin(\theta)+2a_1a_2\cos(\theta)\cos(\varphi),$$

a relationship between the output light intensity and θ and φ can be obtained. For example, assuming that A=1 and the light intensity ratio at the input end is 1:3, then $$a_1=1/2, a_2=\sqrt{3}/2.$$

Figure 6:
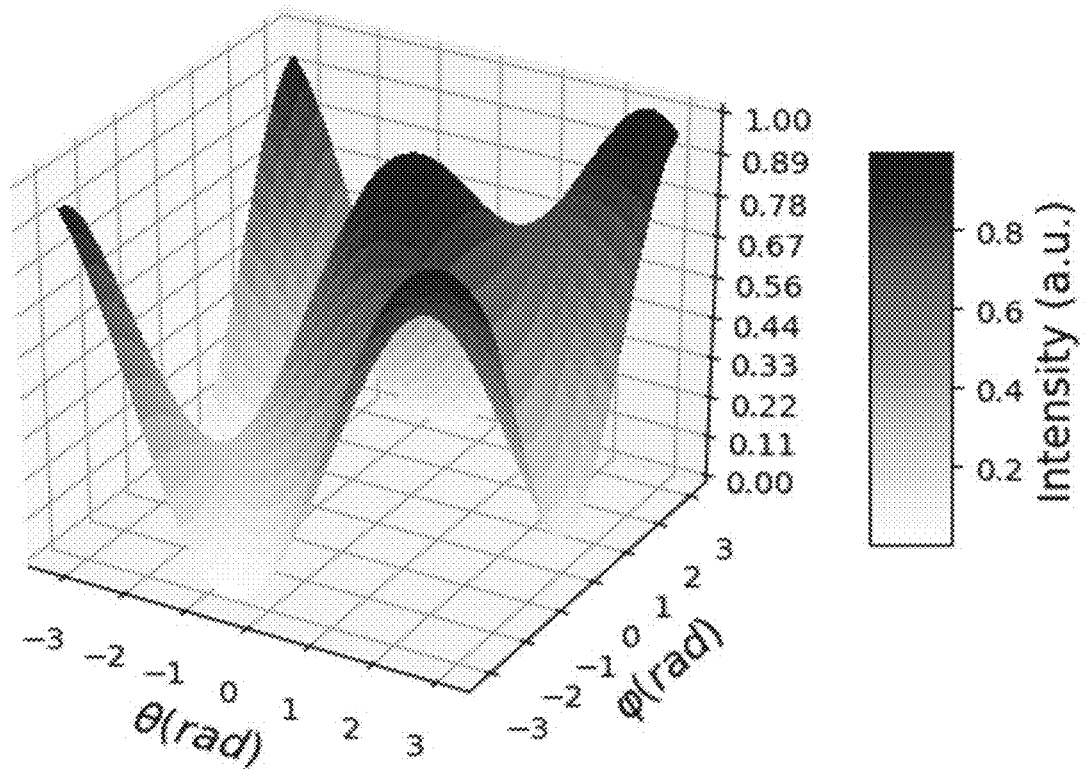
FIG. 6 is a schematic diagram of output intensity distribution of an adjustable beam combiner in the on-chip adaptive optical receiver system of the present disclosure.

Referring to FIG. 6, FIG. 6 is a schematic diagram of output intensity distribution of an adjustable beam combiner 202 in the on-chip adaptive optical receiver system of the present disclosure. It can be seen from FIG. 6 that an optimal solution can be obtained if the ranges of θ and φ are reasonably set.

In this embodiment, a combined light intensity detected by the detector is used as feedback to control the phase shifter to perform phase compensation, and control the beam combiner with an adjustable beam splitting ratio to implement intensity equalization. The on-chip adaptive optical receiver system of the present disclosure may be implemented on an optical chip (which may be a material system such as silicon-on-insulator, silicon nitride-on-insulator, indium phosphide-on-insulator, etc.). The on-chip adaptive optical receiver system of the present disclosure is of a small size, does not require assembly, and can be integrated on the same chip together with a receiver system, so as to meet the requirements on miniaturization and high integration and solve the coupling problem between spatial light and the chip.

Figure 7:
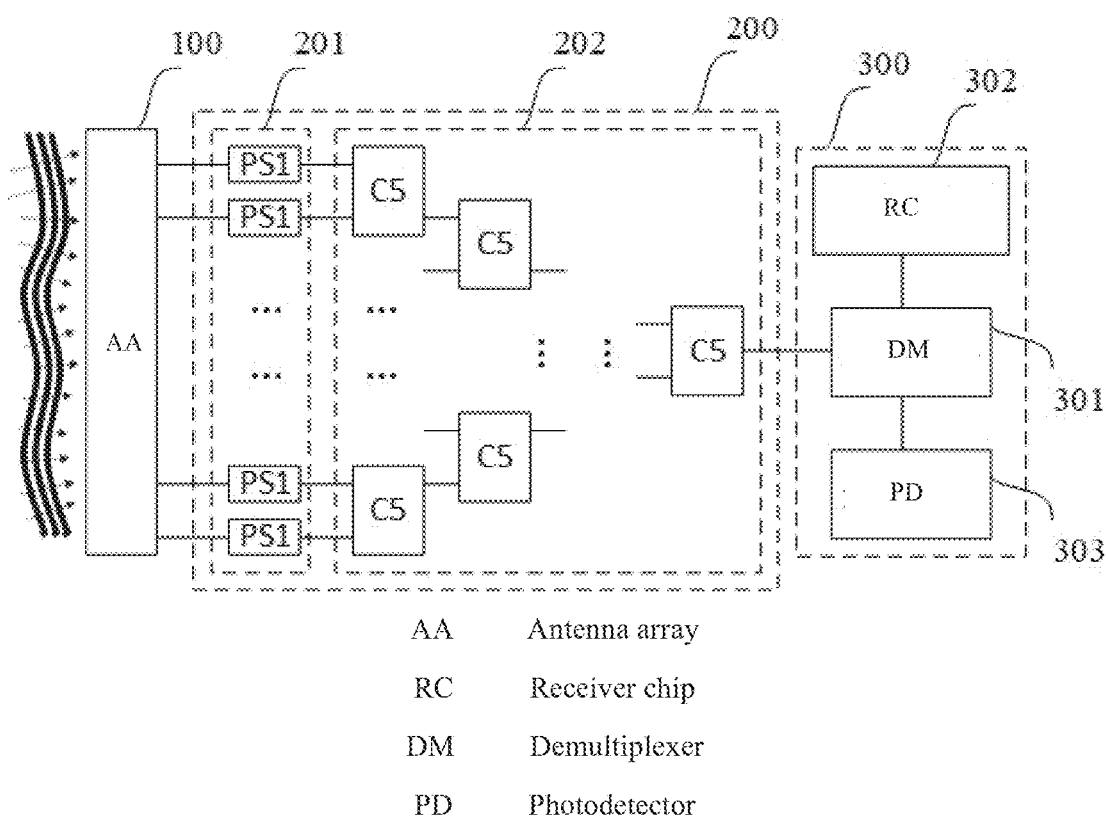
FIG. 7 is a schematic structural diagram of a second embodiment of the on-chip adaptive optical receiver system according to the present disclosure.

Based on the first embodiment of the present disclosure, a second embodiment of the present disclosure is proposed. Referring to FIG. 7, FIG. 7 is a schematic structural diagram of a second embodiment of the on-chip adaptive optical receiver system according to the present disclosure.

The adjustable beam combiner 202 is formed by cascading a plurality of fifth couplers C5. The fifth couplers C5 each include two input ends and an output end. An input end of the coupler cascade is connected to the output end of the first phase shifter PS1. An output end of the coupler cascade is connected to the input end of the demultiplexer 301.

It should be noted that the fifth coupler C5 is also a 3-dB coupler. In this embodiment, cascaded 3-dB couplers are directly used to combine beams. According to calculation, an output intensity of two beam combiners is:

$$P_o=A^2/2(1+2a_1a_2\cos(\varphi))$$

The phase shifter array is controlled to perform phase compensation to make $\varphi=\varphi_1+\Delta\varphi-\varphi_2=0$. In this case, $P_o$ is maximum.

This embodiment has a simpler structure than that of the first embodiment and is applicable to scenarios where intensity balance is not required and the spatial distribution of light spots is relatively uniform.

In this embodiment, a combined light intensity detected by the detector is used as feedback to control the phase shifter to perform phase compensation, and control the beam combiner with an adjustable beam splitting ratio to implement intensity equalization. The on-chip adaptive optical receiver system of the present disclosure may be implemented on an optical chip (which may be a material system such as silicon-on-insulator, silicon nitride-on-insulator, indium phosphide-on-insulator, etc., and may also include more materials, which is not limited in this embodiment). The on-chip adaptive optical receiver system of the present disclosure is of a small size, does not require assembly, and can be integrated on the same chip together with a receiver system, so as to meet the requirements on miniaturization and high integration and solve the coupling problem between spatial light and the chip.

In addition, to achieve the above objective, the present disclosure further provides an optical chip, including the on-chip adaptive optical receiver system described above.

Because the optical chip adopts all the technical schemes of the above embodiments, the optical chip has at least all the beneficial effects achieved by the technical schemes of the above embodiments, and the details will not be repeated here.

In addition, to achieve the above objective, the present disclosure further provides a communication device, including the optical chip described above.

Because the communication device adopts all the technical schemes of the above embodiments, the optical chip has at least all the beneficial effects achieved by the technical schemes of the above embodiments, and the details will not be repeated here.

It should be understood that the above description is for illustration only, and does not constitute any limitation to the technical schemes of the present disclosure. In specific applications, those having ordinary skills in the art can make arrangements as needed, which is not limited in the present disclosure.

It should be noted that the processes described above are merely illustrative and are not intended to limit the scope of protection of the present disclosure. In practical applications, those having ordinary skills in the art can select some or all of the processes according to actual needs to achieve the objectives of the embodiments, which is not limited herein.

In addition, for technical details that are not described in detail in this embodiment, reference can be made to the on-chip adaptive optical receiver system provided in any embodiment of the present disclosure, and the details will not be repeated herein.

Moreover, it should be noted that in the present disclosure, the terms "comprise", "include" or any other variants thereof are intended to encompass non-exclusive inclusion, such that a process, a method, an article or a system including a series of elements not only include those elements, but also includes other elements not listed explicitly or includes intrinsic elements for the process, the method, the article, or the system. Without any further limitation, an element defined by the phrase "comprising one" does not exclude the existence of other same elements in the process, the method, the article, or the system that includes the elements.

The serial numbers of the embodiments of the present disclosure are only for the purpose of description, and do not represent the preference for the embodiments.

From the above detailed description of the embodiments, those having ordinary skills in the art can clearly understand that the methods in the above embodiments can be implemented by software and a necessary general-purpose hardware platform, and of course can also be implemented by hardware, but in many cases, the former is a better implementation. Based on such an understanding, the technical schemes of the present disclosure essentially or the part contributing to conventional technologies may be embodied in the form of a software product. The computer software product is stored in a storage medium (such as a Read-Only Memory (ROM), a Random Access Memory (RAM), a magnetic disk, an optical disc, etc.), and includes several instructions for instructing a terminal device (which may be a computer, a server, a network device, or the like) to execute the methods described in the embodiments of the present disclosure.

The above are only preferred embodiments of the present disclosure, and therefore are not intended to limit the protection scope of the present disclosure. Any equivalent structure or equivalent process transformation made based on the contents of the description and drawings of the present disclosure, or the direct or indirect application of the present disclosure to other related technical fields are all included in the protection scope of the present disclosure.

What is claimed is:

1. An on-chip adaptive optical receiver system, which is applied to optical communication, the on-chip adaptive optical receiver system comprising: an antenna array, an optical phased array, and an optical receiving module, wherein an output end of the antenna array is connected to an input end of the optical phased array, an output end of the optical phased array is connected to an input end of the optical receiving module, and a feedback end of the optical receiving module is connected to a receiving end of the optical phased array;

the antenna array is configured for separating received spatial light to obtain a plurality of sub-light spots and outputting the sub-light spots to the optical phased array;

the optical phased array is configured for performing phase-shifting processing and beam combining processing on the sub-light spots to obtain combined light, and outputting the combined light to the optical receiving module;

the optical receiving module is configured for demultiplexing the combined light to obtain beacon light;

the optical receiving module is further configured for detecting intensity information of the beacon light, generating a feedback signal according to the intensity information, and outputting the feedback signal to the optical phased array; and the optical phased array is further configured for performing compensation phase-shifting processing and intensity equalization processing on the sub-light spots according to the feedback signal to obtain compensated combined light, and outputting the compensated combined light to the optical receiving module.

2. The on-chip adaptive optical receiver system of claim 1, wherein the antenna array comprises a plurality of antenna units; the optical phased array comprises a phase shifter array and an adjustable beam combiner, the phase shifter array comprises a plurality of first phase shifters, an input end of the first phase shifter is connected to an output end of the antenna unit, and an output end of the first phase shifter is connected to an input end of the adjustable beam combiner;

the phase shifter array is configured for performing the phase-shifting processing on the sub-light spots and outputting the phase-shifted sub-light spots to the adjustable beam combiner; and the adjustable beam combiner is configured for performing beam combining processing on the phase-shifted sub-light spots to obtain combined light, and outputting the combined light to the optical receiving module.

3. The on-chip adaptive optical receiver system of claim 2, wherein the optical receiving module comprises a demultiplexer, a receiver chip, and a photodetector; an input end of the demultiplexer is connected to an output end of the adjustable beam combiner, an output end of the demultiplexer is connected to an input end of the receiver chip, and another output end of the demultiplexer is connected to an input end of the photodetector;

the demultiplexer is configured for demultiplexing the combined light to obtain signal light and beacon light, outputting the signal light to the receiver chip, and outputting the beacon light to the photodetector; and the photodetector is further configured for detecting intensity information of the beacon light, generating a feedback signal according to the intensity information, and sending the feedback signal to the optical phased array.

4. The on-chip adaptive optical receiver system of claim 3, wherein the feedback signal comprises a first feedback signal, and the phase shifter array is further configured for receiving the first feedback signal and performing distortion compensation phase-shifting processing on the sub-light spots according to the first feedback signal to obtain compensated sub- light spots; and the phase shifter array is further configured for outputting the compensated sub-light spots to the adjustable beam combiner.

5. The on-chip adaptive optical receiver system of claim 4, wherein the feedback signal comprises a second feedback signal, and the adjustable beam combiner is further configured for receiving the second feedback signal and performing intensity compensation and beam combining on the compensated sub-light spots according to the second feedback signal to obtain compensated combined light; and the adjustable beam combiner is further configured for outputting the compensated combined light to the demultiplexer.

6. The on-chip adaptive optical receiver system of claim 5, wherein the demultiplexer is further configured for demultiplexing the compensated combined light to obtain compensated signal light and outputting the compensated signal light to the receiver chip; and the receiver chip is configured for demodulating the compensated signal light.

7. The on-chip adaptive optical receiver system of claim 6, wherein the adjustable beam combiner comprises a plurality of first two-way adjustable beam splitters and a plurality of second two-way adjustable beam splitters, wherein an input end of each of the plurality of first two-way adjustable beam splitters is connected to an output end of the respective first phase shifter, the second two-way adjustable beam splitters are cascaded in sequence to form a beam splitter cascade, an output end of each of the plurality of first two-way adjustable beam splitters is connected to an input end of the beam splitter cascade, and an output end of the beam splitter cascade is connected to the input end of the demultiplexer;

each of the plurality of first two-way adjustable beam splitters comprises a first coupler, a second phase shifter, and a second coupler, wherein the first coupler corresponds to two first phase shifters, input ends of the first coupler is connected to the output ends of the two first phase shifters, an output end of the first coupler is connected to an input end of the second phase shifter, another output end of the first coupler is connected to an input end of the second coupler, an output end of the second phase shifter is connected to another input end of the second coupler, and an output end of the second coupler is connected to the input end of the beam splitter cascade; and each of the plurality of second two-way adjustable beam splitters comprises a third coupler, a fourth coupler, a third phase shifter, and a fourth phase shifter, wherein an input end of the third phase shifter is a first input end of each of the plurality of second two-way adjustable beam splitters, an output end of the third phase shifter is connected to an input end of the third coupler, another input end of the third coupler is a second input end of each of the plurality of second two-way adjustable beam splitters, an output end of the third coupler is connected to an input end of the fourth phase shifter, another output end of the third coupler is connected to an input end of the fourth coupler, and the fourth coupler has only one output end.

8. The on-chip adaptive optical receiver system of claim 6, wherein the adjustable beam combiner is formed by cascading a plurality of fifth couplers, the fifth couplers each comprise two input ends and an output end.

9. An optical chip, comprising the on-chip adaptive optical receiver system of claim 1.

10. A communication device, comprising the optical chip of claim 9.

* * * * *